(12) United States Patent
Matsuura et al.

(10) Patent No.: US 10,355,252 B2
(45) Date of Patent: Jul. 16, 2019

(54) METHOD FOR MANUFACTURING BOTTOMED CUBOID BATTERY CONTAINER

(71) Applicant: TOYOTA JIDOSHA KABUSHIKI KAISHA, Toyota-shi, Aichi-ken (JP)

(72) Inventors: Tomohiro Matsuura, Toyota (JP); Kazuyuki Kusama, Nagoya (JP); Ikuo Nakagawa, Kariya (JP); Shigeki Takaiwa, Toyota (JP); Kohki Nakamura, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 62 days.

(21) Appl. No.: 15/179,320

(22) Filed: Jun. 10, 2016

(65) Prior Publication Data

US 2016/0361783 A1 Dec. 15, 2016

(30) Foreign Application Priority Data

Jun. 15, 2015 (JP) .................. 2015-120656

(51) Int. Cl.
*H01M 2/00* (2006.01)
*B23K 31/00* (2006.01)
*H01M 2/02* (2006.01)

(52) U.S. Cl.
CPC ....... *H01M 2/0285* (2013.01); *H01M 2/0217* (2013.01); *H01M 2/0257* (2013.01); *B23K 31/00* (2013.01)

(58) Field of Classification Search
None
See application file for complete search history.

(56) References Cited

U.S. PATENT DOCUMENTS

| | | | | |
|---|---|---|---|---|
| 2,488,710 A | * | 11/1949 | Cooper ............... | H05K 9/0049 174/372 |
| 5,255,782 A | * | 10/1993 | Carroll, Jr. ......... | H01M 2/1077 206/703 |
| 2001/0012193 A1 | | 8/2001 | Watanabe et al. | |
| 2011/0117426 A1 | * | 5/2011 | Choi .................... | H01M 2/021 429/178 |

(Continued)

FOREIGN PATENT DOCUMENTS

| | | |
|---|---|---|
| CN | 102064334 A | 5/2011 |
| CN | 102214808 A | 10/2011 |

(Continued)

*Primary Examiner* — Devang R Patel
(74) *Attorney, Agent, or Firm* — Sughrue Mion, PLLC

(57) ABSTRACT

A method for manufacturing a bottomed cuboid battery container includes: forming a first member by folding one piece of a first flat sheet, the first member being constructed of a quadrilateral bottom surface and first paired side surfaces, the first paired side surfaces continuing from the bottom surface and being oppose each other; and forming the bottomed cuboid battery container by welding each of a second flat sheet and a third flat sheet to the first member such that the second flat sheet and the third flat sheet oppose each other and constitute second paired side surfaces. The second flat sheet and the first member are welded from one direction. The third flat sheet and the first member are welded from one direction.

6 Claims, 7 Drawing Sheets

(56) References Cited

U.S. PATENT DOCUMENTS

| | | | |
|---|---|---|---|
| 2011/0151318 A1* | 6/2011 | Lee | H01M 2/263 429/163 |
| 2011/0250475 A1* | 10/2011 | Yamamoto | H01M 2/0277 429/7 |
| 2012/0301779 A1 | 11/2012 | Munenaga et al. | |
| 2013/0108909 A1* | 5/2013 | Matsuo | H01M 2/1061 429/99 |
| 2014/0045020 A1 | 2/2014 | Okutani et al. | |
| 2014/0170471 A1* | 6/2014 | Kanemoto | H01M 2/26 429/164 |
| 2015/0159243 A1* | 6/2015 | Shzuki | C22C 21/00 420/548 |
| 2015/0167126 A1* | 6/2015 | Suzuki | C22C 21/00 420/532 |
| 2016/0204392 A1 | 7/2016 | Kim et al. | |

FOREIGN PATENT DOCUMENTS

| | | | |
|---|---|---|---|
| CN | 104321452 | A | 1/2015 |
| JP | 5031432 | U1 | 7/1973 |
| JP | 06-052842 | A | 2/1994 |
| JP | 10-199494 | A | 7/1998 |
| JP | 2001-135282 | A | 5/2001 |
| JP | 2001216952 | A | 8/2001 |
| JP | 2001236929 | A | 8/2001 |
| JP | 2002-198011 | A | 7/2002 |
| JP | 2003217528 | A | 7/2003 |
| JP | 2005056827 | A | 3/2005 |
| JP | 201228365 | A | 2/2012 |
| JP | 2013-008665 | A | 1/2013 |
| JP | 2013157158 | A | 8/2013 |
| JP | 2013-187087 | A | 9/2013 |
| JP | 201435938 | A | 2/2014 |
| KR | 10-2011-0054705 | A | 5/2011 |
| KR | 10-1481250 | B1 | 1/2015 |
| KR | 10-2015-0028040 | A | 3/2015 |

* cited by examiner

METHOD FOR MANUFACTURING BOTTOMED CUBOID BATTERY CONTAINER

INCORPORATION BY REFERENCE

The disclosure of Japanese Patent Application No. 2015-120656 filed on Jun. 15, 2015 including the specification, drawings and abstract is incorporated herein by reference in its entirety.

BACKGROUND OF THE INVENTION

1. Field of the Invention

The invention relates to a method for manufacturing a battery container.

2. Description of Related Art

Because a nonaqueous electrolyte secondary battery such as a lithium-ion secondary battery is lighter and has higher energy density than an existing battery, the nonaqueous electrolyte secondary battery has been used as a vehicle drive power supply and as a so-called portable power supply for a personal computer, a mobile terminal, and the like in recent years. In particular, as a high output power supply for driving a vehicle such as an electric vehicle (EV), a hybrid vehicle (HV), and a plug-in hybrid vehicle (PHV), use of the lithium-ion secondary battery, which is lightweight and can have the high energy density, is expected to be further widespread in the near future.

A typical nonaqueous electrolyte secondary battery has a structure in which an electrode body is housed in a battery container. A metallic container made of aluminum, stainless steel, or the like is often used as the battery container from a perspective of balancing between strength and the lightweight. As a method for manufacturing the battery container, so-called deep drawing is available. However, such a problem is raised that a variation in thickness tends to be increased by adopting the deep drawing in the case where a container for a particularly large nonaqueous electrolyte secondary battery that is used as the high output power supply for driving the vehicle is manufactured, for example.

In order to solve such a problem of the deep drawing, it is suggested in Japanese Patent Application Publication No. 2013-8665 (JP 2013-8665 A) that a battery container is manufactured by performing: a folding process in which a flat metal sheet in a shape of a developed container is folded to obtain a shape of the container; and a welding process in which portions of the flat sheet that are brought into a state of being butted or stacked by the folding process are joined by welding. However, in this method, in order to prepare one piece of the flat metal sheet in the shape of the developed container, the flat metal sheet in the shape of the developed container has to be cut out from a raw metal sheet, and, at this time, a portion of the raw metal sheet to be discarded is generated. In other words, such a problem of material waste is inherent to the method described in JP 2013-8665 A.

In addition, it is suggested in Japanese Patent Application Publication No. 2002-198011 (JP 2002-198011 A) that a battery container is manufactured by folding a first stainless steel sheet to have an L-shaped cross section, folding a second stainless steel sheet to have a U-shaped cross section, arranging the first stainless steel sheet and the second stainless steel sheet to face each other, and welding ends of the first stainless steel sheet and the second stainless steel sheet by laser. In this method, because the battery container is manufactured by using the two quadrilateral stainless steel sheets, a portion of a raw stainless steel sheet to be discarded is not generated. Thus, such a problem of the material waste can be solved. Meanwhile, when the ends of the first stainless steel sheet and the second stainless steel sheet are subjected to laser welding, there are corner sections that are welded from two directions. When each of the corner sections is welded by means of irradiation of the laser from the two directions, such a problem is raised that strength of the corner sections is degraded.

As described above, such a problem that of the material waste due to disposal of the portion of the raw metal sheet or the degraded strength of the corner section of the battery container due to welding from the two directions is inherent to the method for manufacturing the battery container in the related art that includes folding and welding of the flat sheet.

SUMMARY OF THE INVENTION

The invention provides a method for manufacturing a battery container from a flat sheet material, the method being able to solve the above-described problems of disposal of the material and the strength of the corner section.

A method for manufacturing a battery container according to an aspect of the invention includes: forming a first member by folding one piece of a first flat sheet, the first member being constructed of a quadrilateral bottom surface and first paired side surfaces, the first paired side surfaces continuing from the bottom surface and being oppose each other; and forming the bottomed cuboid battery container by welding each of a second flat sheet and a third flat sheet to the first member such that the second flat sheet and the third flat sheet oppose each other and constitute second paired side surfaces. The second flat sheet and the first member are welded from a side where one surface of the second flat sheet faces. The third flat sheet and the first member are welded from a side where one surface of the third flat sheet faces.

According to the above aspect, components used for manufacturing the battery container are the first flat sheet, the second flat sheet, and the third flat sheet that are basically quadrilateral. Accordingly, a portion to be discarded in a raw metal sheet, from which these three pieces of the flat sheets are cut out, can be reduced. Therefore, a problem of generation of material waste can be solved. In addition, in the case where the second flat sheet and the third flat sheet are welded to the first member (that is, the first flat sheet after being folded in a specified shape), welding is performed on each of the second flat sheet and the third flat sheet by irradiation of thermal energy (for example, a laser beam) from one direction. Therefore, a problem of degraded strength of corner sections, which possibly occurs when welding is performed by the irradiation of the thermal energy (for example, the laser beam) from two directions, can also be solved.

In the above aspect, the second flat sheet and the third flat sheet may be thicker than at least portions of the first member that constitute the first paired side surfaces.

According to the above aspect, the second flat sheet and the third flat sheet that constitute side surfaces perpendicular to a welding direction are thick. Accordingly, it is possible to prevent welded portions from penetrating the second flat sheet and the third flat sheet when the second flat sheet and the third flat sheet are welded to the first flat sheet. Therefore, strength of the welded portions can be retained.

The above aspect may include forming recesses, to which the second flat sheet and the third flat sheet can be fitted, in the first paired side surfaces and the bottom surface of the first member.

According to the above aspect, recesses (for example, grooves or notches) that are formed by implementing said process serve as guides. That is, the second flat sheet and the third flat sheet can easily be arranged (positioned) at ends of the first flat sheet by fitting the second flat sheet and the third flat sheet to said recesses that are located in specified portions of the first member. Therefore, the battery container can easily be manufactured.

The forming recesses may include notching a portion of the first flat sheet, the portion corresponding to ends of the bottom surface in a perpendicular direction to a direction in which the first paired side surfaces oppose each other.

In the above aspect, the first flat sheet may be made of A1050 aluminum, and the second flat sheet and the third flat sheet may be made of an A3003 aluminum alloy or an A5052 aluminum alloy.

According to the above aspect, because the first flat sheet is formed from the A1050 aluminum with an excellent bending property, the first flat sheet can easily be folded. Because the second flat sheet and the third flat sheet are formed from the A3003 aluminum alloy or the A5052 aluminum alloy with an excellent welding property, high strength can be secured for the welded portion between the first flat sheet and each of the second flat sheet and the third flat sheet.

The bottomed cuboid battery container that is manufactured by the above aspect has such an advantage that material waste can be reduced. In addition, the problem of the degraded strength of the corner sections of the bottomed cuboid battery container, which is caused by the irradiation of the thermal energy (for example, the laser beam) from the two directions for welding, can be solved in said battery container.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
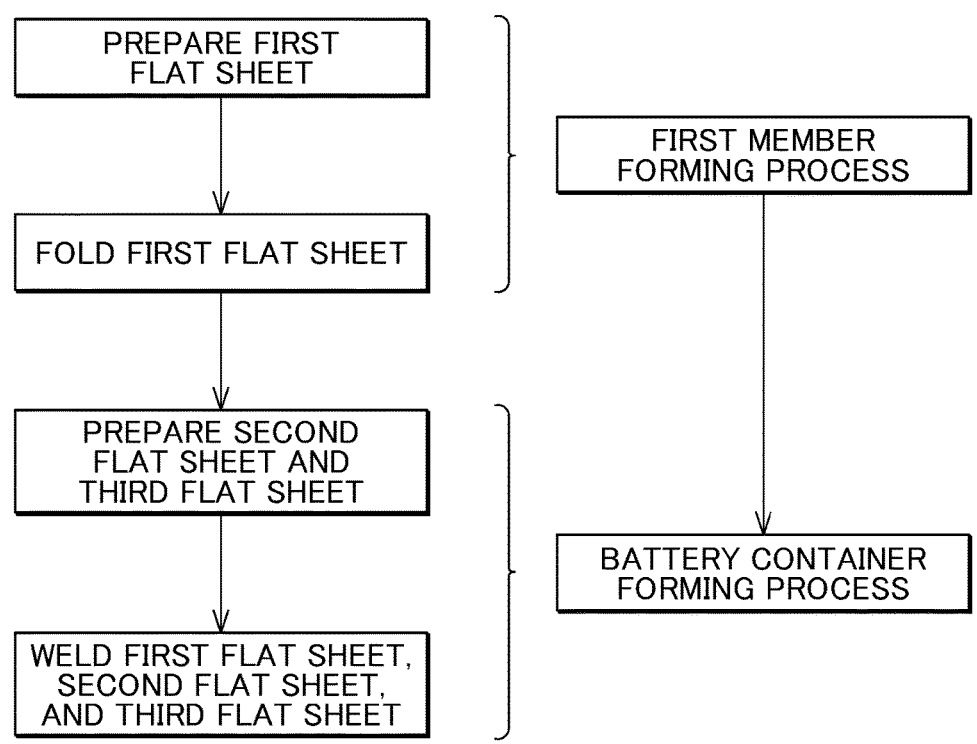
FIG. 1 is a flowchart of a process for a method for manufacturing a battery container according to a first embodiment.

A description will hereinafter be made on some embodiments of the invention with reference to the drawings. In the following drawings, members and portions that exert the same actions are denoted by the same reference numerals for the description. In addition, dimensional relationships (length, width, thickness, and the like) in each of the drawings do not reflect actual dimensional relationships.

FIG. 1 is a flowchart that shows an overview of a process for a method for manufacturing a battery container in a first embodiment. The method for manufacturing according to this embodiment includes a first member forming process and a battery container forming process. In said first member forming process, a first flat sheet is prepared, and the first flat sheet is folded. In said battery container forming process, a second flat sheet and a third flat sheet are prepared, and the second flat sheet and the third flat sheet are welded to the first flat sheet.

Figure 2A:
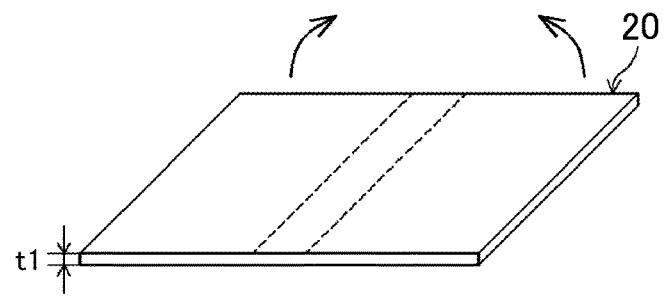
FIG. 2A is a view that schematically shows a first member forming process in the method for manufacturing the battery container according to the first embodiment.
Figure 2B:
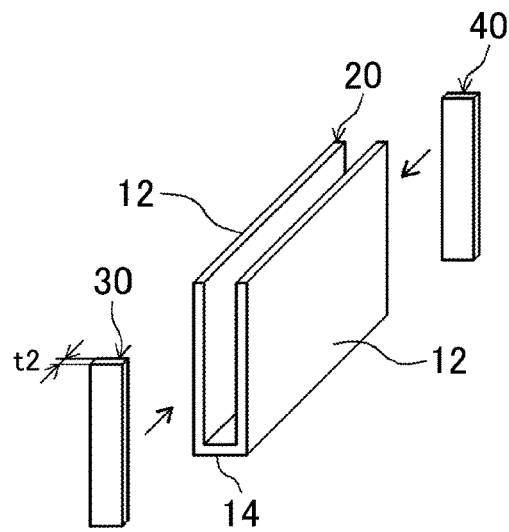
FIG. 2B is a view that schematically shows a battery container forming process in the method for manufacturing the battery container according to the first embodiment.
Figure 2C:
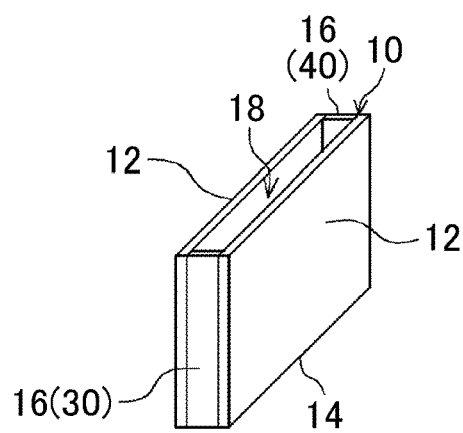
FIG. 2C is a view that schematically shows a bottomed cuboid battery container that is obtained by the method for manufacturing the battery container according to the first embodiment.

A detailed description will be made on the method for manufacturing according to this embodiment by using FIG. 2. FIG. 2A to FIG. 2C schematically show the method for manufacturing of this embodiment. A battery container 10 that is manufactured in this embodiment is a bottomed cuboid battery container that has an opening 18 in an upper surface. The battery container 10 has: a quadrilateral (here, rectangular) bottom surface 14; first paired side surfaces 12 that continue from said bottom surface 14, are each folded at a right angle from said bottom surface 14, and oppose each other; and second paired side surfaces 16 that are each arranged in a state of being perpendicular to said first paired side surfaces 12 and said bottom surface 14 and oppose each other.

A specific description will be made on a process of forming a first member from a first flat sheet 20 with reference to FIG. 2A. As shown in FIG. 2A, one piece of the first flat sheet 20 is prepared. The first paired side surfaces 12 and the bottom surface 14 of the battery container 10 are formed of this first flat sheet 20. Thus, size of the first flat sheet 20 is determined in accordance with dimensions of the first paired side surfaces 12 and the bottom surface 14 of the battery container 10. The first flat sheet 20 is usually quadrilateral (in particular, rectangular). Here, the first flat sheet 20 has thickness t1. Such a first flat sheet 20 is preferably made of metal, such as aluminum, made of an aluminum alloy, or made of stainless steel.

Portions that become the first paired side surfaces 12 and a portion that becomes the bottom surface 14 are determined in the first flat sheet 20, and then portions to be folded (that is, portions that serve as fold lines) are determined in the first flat sheet 20. The first paired side surfaces 12 are usually in the same size. In FIG. 2A, the portions to be folded (fold line portions) are indicated by broken lines. A portion between the two broken lines is the portion that becomes the bottom surface 14. A portion from one of the broken lines to an end in a horizontal direction of the drawing (that is, an end that constitutes a peripheral edge (a long side) of the opening) is the portion that becomes one of the first paired side surfaces 12. The first flat sheet 20 is folded along these fold lines in arrow directions in FIG. 2A. The first flat sheet 20 is typically folded such that the first paired side surfaces 12 are vertically raised from the bottom surface 14, that is, an angle defined by each of the first paired side surfaces 12 and the bottom surface 14 becomes 90°. In this way, the first member that is constructed of the first paired side surfaces 12 and the bottom surface 14 is formed.

Next, a description will be made on a process of forming the bottomed cuboid battery container by using the second flat sheet and the third flat sheet with reference to FIG. 2B. First, as shown in FIG. 2B, a pair of a second flat sheet 30 and a third flat sheet 40 is prepared. The second paired side surfaces 16 of the battery container 10 are formed of these second flat sheet 30 and third flat sheet 40. Thus, size of the second flat sheet 30 and that of the third flat sheet 40 are determined in accordance with dimensions of the second paired side surfaces 16 of the battery container 10. The second flat sheet 30 and the third flat sheet 40 are usually quadrilateral (in particular, rectangular). Here, each of the second flat sheet 30 and the third flat sheet 40 has thickness t2 (that may be the same as the above thickness t1 in this embodiment). The second flat sheet 30 and the third flat sheet 40 are usually in the same size. Each of the second flat sheet 30 and the third flat sheet 40 is preferably made of metal, such as aluminum, made of the aluminum alloy, or made of stainless steel (in this embodiment, a material of the first flat sheet 20 may be the same as materials of the second flat sheet 30 and the third flat sheet 40).

Each of such paired second flat sheet 30 and third flat sheet 40 is arranged at ends of the first paired side surfaces 12 and an end of the bottom surface 14 of the first member (the folded first flat sheet) 20. In this way, a bottomed cuboid that has the opening 18 in an opposing surface of the bottom surface 14 (usually becomes an upper surface of a battery during use of the battery. Such an opposing surface will hereinafter be described as the "upper surface".) can be obtained. Then, after the second flat sheet 30 and the third flat sheet 40 are arranged at specified positions as shown in FIG. 2B, an operation for welding the second flat sheet 30 and the third flat sheet 40 to the first member 20 is performed. For example, laser welding or the like is used as welding. Welding is performed from directions that are perpendicular to the second paired side surfaces 16 (that is, directions from outside of the battery container 10 toward outer surfaces of the side surfaces 16). That is, the second flat sheet 30 and the first member 20 as well as the third flat sheet 40 and the first member 20 are welded by means of irradiation of a laser beam from one direction (typically, a direction that is perpendicular to an outer surface of the second flat sheet 30 or the third flat sheet 40 from the outside of the battery container 10). Note that the irradiation of the laser beam from the one direction is not limited to that an angle defined by an irradiation direction of the laser beam and each of the second flat sheet 30 and the third flat sheet 40 is always constant. That is, the irradiation from the one direction may include that the second flat sheet 30 is irradiated with the laser only from a side where one of surfaces thereof faces toward the one surface of said second flat sheet 30 when the first member 20 and the second flat sheet 30 are welded, and that the third flat sheet 40 is irradiated with the laser only from a side where one of surfaces thereof faces toward the one surface of said third flat sheet 40 when the first member 20 and the third flat sheet 40 are welded.

As it has been described so far, the first member is formed from the first flat sheet 20, and the second flat sheet 30 and the third flat sheet 40 are further welded to the first member 20. In this way, the bottomed cuboid battery container 10 that has the opening 18 in the upper surface as shown in FIG. 2C is manufactured.

Figure 3A:
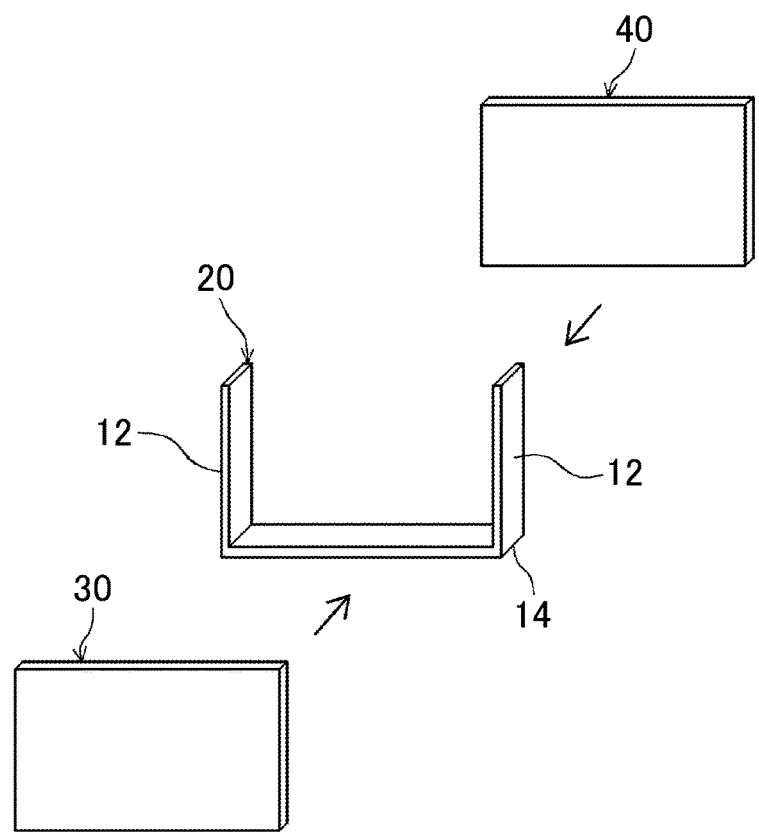
FIG. 3A is a view that schematically shows an example of a case where first paired side surfaces serve as short side surfaces and second paired side surfaces serve as long side surfaces in the method for manufacturing the battery container according to the first embodiment.
Figure 3B:
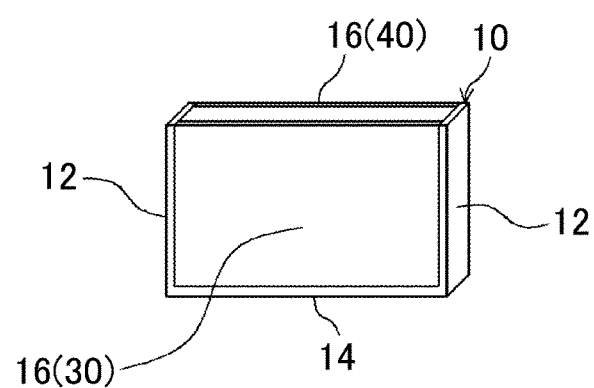
FIG. 3B is a view that schematically shows the battery container that can be obtained by the example shown in FIG. 3A.

Note that the first paired side surfaces 12 and the second paired side surfaces 16 are perpendicular to the bottom surface 14 in the first embodiment described by using FIG. 2. However, the first paired side surfaces 12 and the second paired side surfaces 16 may not be perpendicular to the bottom surface 14. In addition, in the first embodiment described by using FIG. 2, the first paired side surfaces 12 that oppose each other serve as long side surfaces, and the second paired side surfaces 16 that oppose each other serve as short side surfaces. A long side surface refers to a side surface that continues from a long side of the rectangular bottom surface 14 and a short side surface refers to a side surface that continues from a short side of the rectangular bottom surface 14. However, as shown in FIG. 3A, the opposing first paired side surfaces 12 can serve as the short side surfaces, and the opposing second paired side surfaces 16 can serve as the long side surfaces. That is, the battery container may be manufactured as below. The one piece of the first flat sheet 20 is folded to form the first member that constitutes the short side surfaces 12 and the bottom surface 14. Furthermore, as shown in FIG. 3B, each of the paired second flat sheet 30 and third flat sheet 40 is welded to the folded first flat sheet (that is, the first member) 20 such that the long side surface 16 is formed at the ends of the short side surface 12 and the end of the bottom surface 14.

As described above, the three quadrilateral (typically rectangular) flat sheets (the first flat sheet 20, the second flat sheet 30, and the third flat sheet 40) are basically used to manufacture such a battery container 10. Thus, a portion to be discarded is not generated from a raw material sheet when the three flat sheets (the first flat sheet 20, the second flat sheet 30, and the third flat sheet 40) are cut out from the raw material sheet. In addition, the second flat sheet 30 and the first member (the folded first flat sheet) 20 as well as the third flat sheet 40 and the first member 20 can be welded from the one direction. Thus, a problem of degraded strength of corner sections of the battery container that possibly occurs when welding is performed from two directions can also be solved. Furthermore, because two portions are folded, productivity of the battery container 10 is improved in comparison with the related art (the art described in JP 2013-8665 A and JP 2002-198011 A) that requires more folded portions (number of folding). Moreover, the battery container 10 can be produced by using a material with higher strength than a material of the battery container that is produced by deep drawing.

In addition, the first paired side surfaces 12 and the second paired side surfaces 16 are formed from different flat sheets in the method for manufacturing the battery container according to this embodiment. Accordingly, there is such an advantage that it is possible to separately exercise various types of ingenuity on the first paired side surfaces 12 (here, the long side surfaces) and the second paired side surfaces 16 (here, the short side surfaces). A description will hereinafter be made on various embodiments of the method for manufacturing the battery container. Note that the method for manufacturing the battery container according to the invention is not limited to the embodiments that will be described below.

First Modified Example of the First Embodiment

In the above first embodiment, the thickness t1 of the first flat sheet is the same as the thickness t2 of each of the second flat sheet and the third flat sheet (t1=t2). However, they may differ in thickness. The second flat sheet and the third flat sheet in the thickness t2 that constitute the second paired side surfaces are preferably thicker than at least portions of the first member in the thickness t1 that constitute the first paired side surfaces.

For example, as shown in FIG. 2, in the case where the first paired side surfaces 12 serve as the long side surfaces and the second paired side surfaces 16 serve as the short side surfaces, it can be arranged in such a way that the thickness t2 of the second flat sheet 30 and the third flat sheet 40 that form the short side surface are thicker than the thickness t1 that forms at least the long side surface of the first flat sheet 20. According to such a configuration, the second flat sheet 30 and the third flat sheet 40 that constitute the short side surfaces perpendicular to welding directions are thick. Thus, when the second flat sheet 30 and the third flat sheet 40 are welded to the first flat sheet 20, penetration during welding can be prevented, and strength of welded portions can be retained. In addition, following effects are realized when the battery container 10 is used for a secondary battery.

Figure 4:
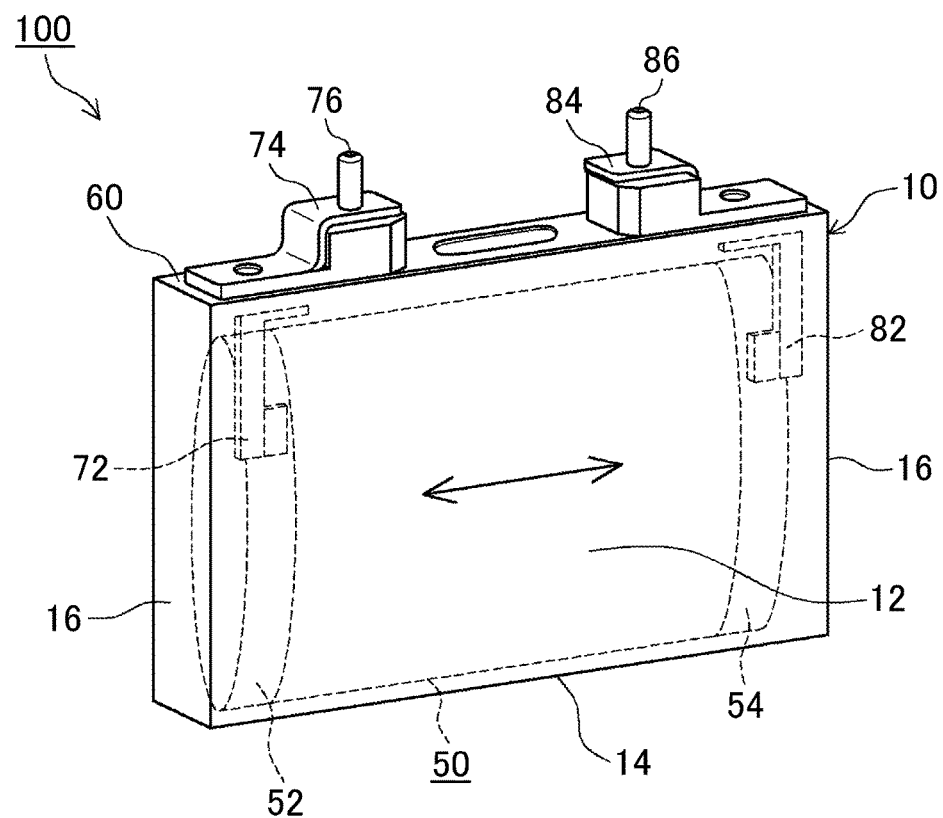
FIG. 4 is a perspective view that schematically shows one example of a battery using the battery container obtained by the method for manufacturing the battery container according to the first modified example of the first embodiment.

FIG. 4 shows an example in which a battery (a nonaqueous electrolyte secondary battery 100) is configured by using the battery container 10 that is manufactured by the first modified example of the first embodiment. The nonaqueous electrolyte secondary battery 100 is a lithium-ion secondary battery, for example. In the nonaqueous electrolyte secondary battery 100, a wound electrode body 50 in a flat shape is housed in the battery container 10, the opening that opposes the bottom surface 14 of the battery container 10 is closed by a lid body 60. The wound electrode body 50 has a configuration that a positive electrode sheet, a negative electrode sheet, and a separator are stacked and wound. A positive electrode sheet exposed section 52 and a negative electrode sheet exposed section 54 are formed at both ends in a winding axis direction (an arrow direction in FIG. 4) of the wound electrode body 50. The positive electrode sheet exposed section 52 is connected to a positive electrode inner terminal 72 and is electrically connected to a bolt 76 via a positive electrode outer terminal 74. Similarly, the negative electrode sheet exposed section 54 is connected to a negative electrode inner terminal 82 and is electrically connected to a bolt 86 via a negative electrode outer terminal 84. The wound electrode body 50 is typically housed in the battery container 10 such that the winding axis direction thereof becomes orthogonal to the short side surfaces 16 of the cuboid battery container 10.

In the cases where a certain kind of abnormality occurs in the nonaqueous electrolyte secondary battery 100 and high-temperature gas is produced in the wound electrode body 50 in the container 10, the gas flows in the winding axis direction, and the high-temperature gas first collides with each of the second paired side surfaces (the short side surfaces) 16 that constitute the container 10. Accordingly, the second paired side surfaces 16 tend to be heated by the high-temperature gas, and a temperature thereof tends to be increased. At this time, thermal capacities of the second flat sheet 30 and the third flat sheet 40 that form the second paired side surfaces 16 can be increased by increasing the thickness t2 of each of the second flat sheet 30 and the third flat sheet 40 that form the second paired side surfaces 16. In this way, a temperature increase of the second paired side surfaces 16 by the high-temperature gas can be made gradual, so as to prevent damage thereto. Note that it can also be considered to thicken all of the side surfaces of the battery container 10, that is, both of the second paired side surfaces (the short side surfaces) 16 and the first paired side surfaces (the long side surfaces) 12. However, thickening of only the second paired side surfaces 16 is advantageous in terms of size reduction, weight reduction, and cost reduction of the battery container in comparison with a case where all of the side surfaces of the battery container 10, that is, both of the second paired side surfaces (the short side surfaces) 16 and the first paired side surfaces (the long side surfaces) 12 are thickened.

Alternatively, in order to obtain such an effect of preventing bloating of the battery container 10 in the long side surfaces 12 due to production of the gas or the like, the first paired side surfaces, which is formed from the first flat sheet with the bottom surface, may serve as the short side surfaces, and the second paired side surfaces, which is formed from the second flat sheet and the third flat sheet may serve as the long side surface (see FIG. 3), and the second flat sheet and the third flat sheet in the thickness t2, which form the long side surfaces, may become thicker than the first flat sheet in the thickness t1 that form the short side surfaces. Here, thickening of only the long side surfaces is also advantageous in terms of the size reduction, the weight reduction, and the cost reduction of the battery container in comparison with the case where all of the side surfaces of the battery container are thickened.

Second Embodiment

Figure 5A:
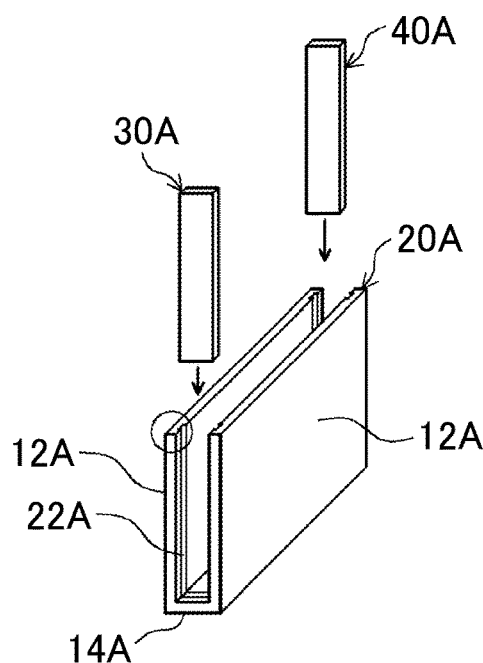
FIG. 5A is a view that schematically shows a battery container forming process in a method for manufacturing a battery container according to a second embodiment.

A second embodiment is characterized by further including a process of forming recesses, to which the second flat sheet and the third flat sheet can be fitted, in either one or both of the first paired side surfaces and the bottom surface of the first member (hereinafter also referred to as a "recess forming process"). For example, as shown in FIG. 5A, the recess forming process is performed on a first member 20A that is used in this embodiment, and grooves 22A as the recesses are thereby formed along both ends of long side surfaces 12A and the bottom surface 14A where short side surfaces 16A are arranged in the vicinity of both of said ends. Here, the grooves 22A are formed such that width (groove width) of each of the two grooves 22A is substantially equal to thickness of each of a second flat sheet 30A and a third flat sheet 40A. The recess forming process can be performed by performing a specified pressing process such that the grooves 22A are formed in the first member 20A that has been formed in advance by folding the first flat sheet. Alternatively, depending on shapes of the recesses (the grooves) and forming positions thereof (that is, as long as the shapes and the positions do not affect folding of the first flat sheet 20A), the recess forming process can be performed by forming the recesses (the grooves) in the first flat sheet 20A that has not been folded.

Figure 5B:
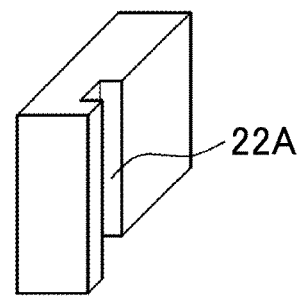
FIG. 5B is an enlarged view of inside of a circular frame in FIG. 5A.

Next, as shown in FIG. 5A, the second flat sheet 30A and the third flat sheet 40A are each arranged at ends of the first paired side surfaces 12A and the end of the bottom surface 14A of the first member 20A. Here, in this embodiment, the above grooves 22A are provided in the vicinity of the ends of the first paired side surfaces 12A and in the vicinity of the ends of the bottom surface 14A. FIG. 5B is an enlarged view of inside of a circular frame in FIG. 5A and shows a specific shape of the groove 22A. The groove 22A is formed to correspond to an outer edge shape of each of the second flat sheet 30A and the third flat sheet 40A, and the groove width of the groove 22A is substantially equal to the thickness of each of the second flat sheet 30A and the third flat sheet 40A. Accordingly, in this embodiment, the second flat sheet 30A and the third flat sheet 40A can be fitted to such grooves 22A as indicated by arrows in FIG. 5A. In this way, the second flat sheet 30A and the third flat sheet 40A can easily be arranged (positioned) at ends of the first member 20A. In addition, the second flat sheet 30A and the third flat sheet 40A are retained by the grooves 22A. Thus, welding can easily be performed, and thus a battery container 10A can easily be manufactured.

Figure 5C:
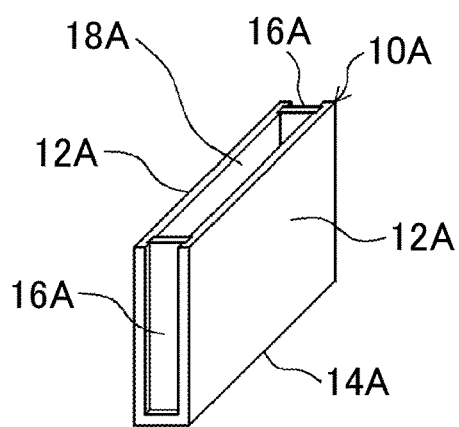
FIG. 5C is a view that schematically shows a bottomed cuboid battery container that is obtained by the method for manufacturing the battery container according to this embodiment.

As it has been described so far, the bottomed cuboid battery container 10A that has an opening 18A in the upper surface shown in FIG. 5C can be manufactured. Note that an example in which the groove 22A is formed in both of the first paired side surfaces 12A and the bottom surface 14A has been described by using FIG. 5. However, the groove 22A may only be formed in either one of the first paired side surfaces 12 and the bottom surface 14. Also, in this case, the second flat sheet 30A and the third flat sheet 40A can easily be arranged (positioned) at the ends of the first flat sheet 20A by fitting the second flat sheet 30A and the third flat sheet 40A to the grooves 22A. Thus, the second flat sheet 30A and the third flat sheet 40A can easily be welded to the first flat sheet 20A, and the battery container 10A can easily be manufactured.

Third Embodiment

Figure 6A:
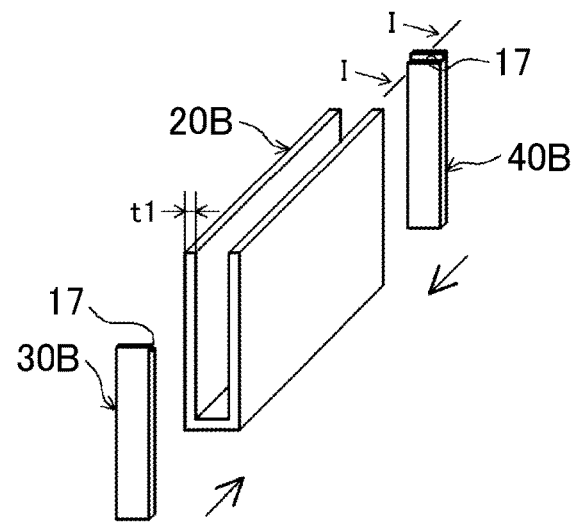
FIG. 6A is a view that schematically shows a battery container forming process in a method for manufacturing a battery container according to a third embodiment.
Figure 6B:
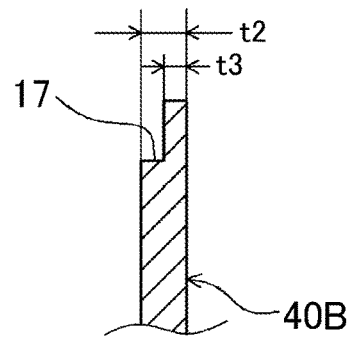
FIG. 6B is a partial cross-sectional view of a third flat sheet that is cut along line I-I in FIG. 6A.
Figure 6C:
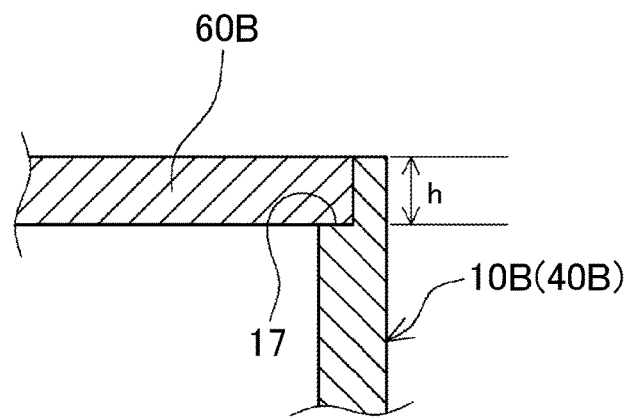
FIG. 6C is a partial cross-sectional view of a lid body and the third flat sheet in the case where said lid body is placed on a step section.

A third embodiment is characterized in that a step section is formed in a surface of each of the second flat sheet and the third flat sheet, the surface being located on an inner side of a battery container and is in the vicinity of an end that constitutes a peripheral edge of an opening at a time when the battery container is formed. In the case where a sealed-type battery is manufactured by using the battery container, the opening in an upper surface of the battery container is closed by a lid body, and the lid body is next welded to the battery container and sealed in a final step. For example, as shown in FIG. 6A to FIG. 6C, a step section 17 is provided in a surface of each of a second flat sheet 30B and a third flat sheet 40B that is located on the inner side of the battery container and is in the vicinity of an end on a side that constitutes the peripheral edge of the opening. In the case where the step section 17 is provided just as described, a lid body 60B is placed on an upper surface of the step section 17 as shown in FIG. 6C, and the lid body 60B can thereby easily be positioned and welded. In addition, in the case where the lid body 60B is placed on the upper surface of the step section 17 just as described, laser welding can be performed from an upper direction of the lid body 60B of a battery container 10B. According to such laser welding from the upper direction, a speed increase and the cost reduction of welding can be realized.

In addition, as shown in FIG. 6B, in the cases where thickness of each of the second flat sheet 30B and the third flat sheet 40B is set as t2 and thickness of an upper section from the step section 17 (that is, a portion that comes in contact with an end surface of the lid body 60B) is set as t3, the thickness t3 of the upper section from the step section 17 in each of the second flat sheet 30B and the third flat sheet 40B is preferably equal to thickness t1 of each of first paired side surfaces of a first member 20B. When each of them is set in the thickness just as described, thickness of a welded portion between the lid body 60B and the battery container 10B on the battery container side (that is, all of the first paired side surfaces and the second paired side surfaces) becomes the same over an entire periphery of the lid body 60B. Accordingly, welding can easily be performed, and accuracy of welding can be improved. In addition, as shown in FIG. 6C, height h of a step in the step section 17 is preferably the same as the thickness of the lid body 60B. It is because an upper end of the battery container 10B aligns with an upper surface of the lid body 60B in terms of the height and welding can thereby easily be performed.

Second Modified Example of the First Embodiment

In the above first embodiment, the material of the first flat sheet is the same as the materials of the second flat sheet and the third flat sheet. However, in this second modified example, the material of the first flat sheet differs from the materials of the second flat sheet and the third flat sheet. The first flat sheet is preferably formed from A1050 aluminum, and the second flat sheet and the third flat sheet are preferably formed from an A3003 aluminum alloy or an A5052 aluminum alloy.

For example, in the battery container 10 shown in FIG. 2, the first flat sheet 20 that constitutes the long side surfaces and the bottom surface is formed from the A1050 aluminum, and the second flat sheet 30 and the third flat sheet 40 that constitute the short side surfaces are formed from the A3003 aluminum alloy or the A5052 aluminum alloy. In this way, because the first flat sheet 20 is formed from the A1050 aluminum with an excellent bending property, the first flat sheet 20 can easily be folded. In addition, because the second flat sheet 30 and the third flat sheet 40 are formed from the A3003 aluminum alloy or the A5052 aluminum alloy with an excellent welding property, high strength can be secured in a welded portion between the first flat sheet 20 and each of the second flat sheet 30 and the third flat sheet 40.

Meanwhile, the A3003 aluminum alloy and the A5052 aluminum alloy have higher strength than the A1050 aluminum. Accordingly, in the case where the nonaqueous electrolyte secondary battery as shown in FIG. 4 is produced by using such a battery container, it is possible to prevent the damage to the short side surfaces, which possibly occurs when the certain kind of the abnormality occurs to the nonaqueous electrolyte secondary battery, the high-temperature gas is produced, and the high-temperature gas collides with each of the short side surfaces.

Note that the thickness t1 of the first flat sheet 20 may be the same as the thickness t2 of each of the second flat sheet 30 and the third flat sheet 40 in this second modified example.

Fourth Embodiment

Figure 7A:
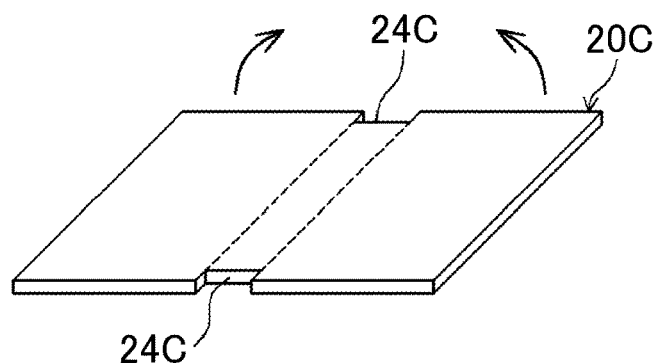
FIG. 7A is a view that schematically shows a first member forming process in a method for manufacturing a battery container according to a fourth embodiment.

A fourth embodiment is characterized in that notches as recesses are provided in a portion of the first flat sheet (the first member) that constitutes the bottom surface, depth of each of the notches being substantially equal to the thickness of each of the second flat sheet and the third flat sheet. Here, the depth of the notch refers to length in a direction from the end of the bottom surface (a horizontal surface) of the first member (the folded first flat sheet) toward inside of said first member (said first flat sheet). For example, as shown in FIG. 7A, portions that become first paired side surfaces 12C and a bottom surface 14C of a battery container 10C are determined in a first flat sheet 20C, and then portions to be folded (that is, portions that serve as fold lines) are determined. In FIG. 7A, the portions to be folded (the portions that serve as the fold lines) are indicated by broken lines. Then, the portion that become the bottom surface 14C (the portion between the fold lines) are notched in depth that is equal to thickness of each of second and third flat sheets 30C, 40C, so as to provide notches 24C. Next, the flat sheet 20C is folded along these fold lines in arrow directions in FIG. 7A. The flat sheet 20C is typically folded such that the first paired side surfaces 12C are perpendicularly raised from the bottom surface 14C, that is, an angle defined by the first side surface 12C and the bottom surface 14C becomes 90°.

Figure 7B:
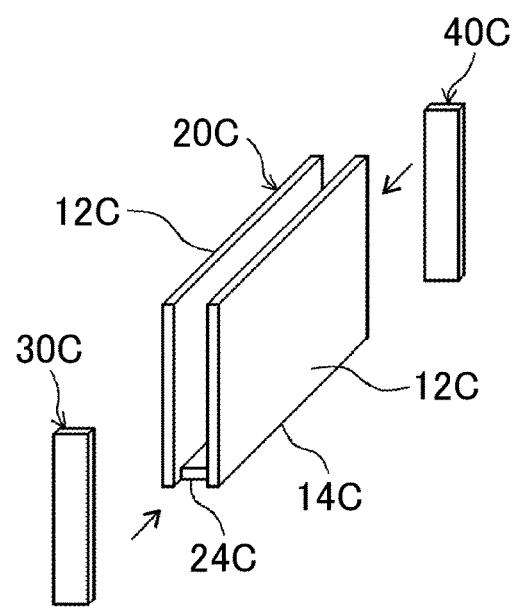
FIG. 7B is a view that schematically shows a battery container forming process in the method for manufacturing the battery container according to the fourth embodiment.

Next, as shown in FIG. 7B, each of the paired second flat sheet 30C and third flat sheet 40C are arranged at ends of the first paired side surfaces 12C and an end of the bottom surface 14C of the first member (the folded first flat sheet) 20C. Here, the above notch 24C is designed to have the thickness that is equal to width of each of the second flat sheet 30C and the third flat sheet 40C. Thus, the second flat sheet 30C and the third flat sheet 40C can be fitted to the above notches 24C. In this way, the second flat sheet 30C and the third flat sheet 40C can easily be arranged at ends of the first flat sheet 20C and can easily be welded.

Figure 7C:
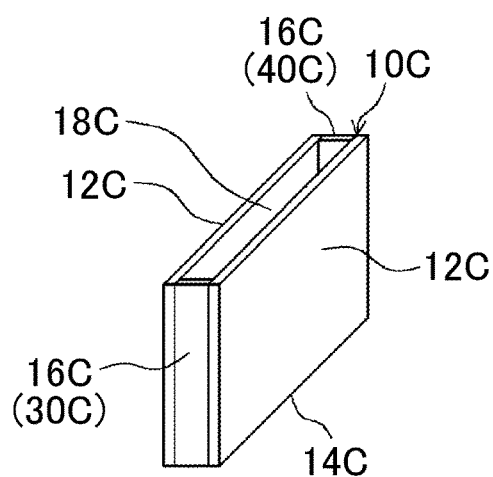
FIG. 7C is a view that schematically shows a bottomed cuboid battery container that can be obtained by the method for manufacturing the battery container according to the fourth embodiment.

As it has been described so far, the bottomed cuboid battery container 10C that has an opening 18C in an upper surface shown in FIG. 7C can be manufactured. Note that portions to be discarded are generated in a raw metal sheet due to the notches 24C in a fourth embodiment. However, the portions to be discarded are significantly smaller than those in the related art (the art described in JP 2013-8665 A). Thus, an amount of the portions to be discarded of the material is significantly reduced when compared to the related art (the art described in JP 2013-8665 A). Meanwhile, there is such an advantage that the number of the portions that serve as the fold lines in the first flat sheet 20C is reduced. Note that the second flat sheet 30C and the third flat sheet 40C can easily be arranged at the ends of the first flat sheet 20C even when the depth of the notch 24C is slightly larger than the thickness of each of the second flat sheet 30C and the third flat sheet 40C. In this way, the depth of the notch 24C can become larger than the thickness of each of the second flat sheet 30C and the third flat sheet 40C in such a degree that the portions to be discarded of the raw metal sheet do not become excessively large.

The description has been made so far on the first embodiment, the modified examples thereof, and the second to fourth embodiments. However, two or more of the modified examples of the first embodiment and the second to fourth embodiments can appropriately be combined and implemented.

Another aspect of the invention provides the battery container that can be obtained by the above method for manufacturing. Said battery container is a bottomed cuboid battery container that has an opening in an upper surface opposing a bottom surface, and each of a second flat sheet and a third flat sheet that constitutes second paired side surfaces opposing each other is welded from one direction to a first member that constitutes first paired side surfaces opposing each other and a bottom surface continued from said first paired side surfaces. As described above, said battery container has such an advantage that it can be manufactured while material waste can be reduced. In addition, the problem of the degraded strength of the corner sections of the battery container in the related art (the art described in JP 2002-198011 A), which is caused by welding in the two directions, is solved in said battery container.

The battery container that is obtained by the above method for manufacturing is suited as a battery container for the nonaqueous electrolyte secondary battery, and the nonaqueous electrolyte secondary battery can be produced by using said battery container and following a known method. A configuration and a shape of an electrode body that is housed in the battery container may be designed in accordance with a type and usage of the nonaqueous electrolyte secondary battery and do not affect implementation of the invention. In addition, said nonaqueous electrolyte secondary battery can be used for various applications, and use thereof as a large battery is particularly advantageous. As a preferred application, a drive power supply that is mounted in a vehicle such as an electric vehicle (EV), a hybrid vehicle (HV), a plug-in hybrid vehicle (PHV), and the like.

The examples of the invention has been described so far in detail. However, these are merely illustrative. The art according to the invention includes various modifications and changes that are made to the examples that have been exemplified above.

The invention claimed is:

1. A method for manufacturing a bottomed cuboid battery container comprising:
    forming a first member by folding one piece of a first flat sheet, the first member being constructed of a quadrilateral bottom surface and first paired side surfaces, the first paired side surfaces continuing from the quadrilateral bottom surface and being opposed to each other; and
    forming the bottomed cuboid battery container by welding each of a second flat sheet and a third flat sheet to the first member such that the second flat sheet and the third flat sheet oppose each other and constitute second paired side surfaces, the second flat sheet and the first member being welded from a side where one surface of the second flat sheet faces outside of the bottomed cuboid battery container, the third flat sheet and the first member being welded from a side where one surface of the third flat sheet faces outside of the bottomed cuboid battery container;
    wherein the second flat sheet and the third flat sheet are welded from outside of the bottomed cuboid battery container,
    wherein the first member includes a set of notches,
    wherein the second flat sheet and the third flat sheet are fitted to respective notches of the set of notches, and wherein depths of each of the notches are substantially equal to thicknesses of each of the second flat sheet and the third flat sheet.

2. The method for manufacturing a bottomed cuboid battery container according to claim 1, wherein
the second flat sheet and the third flat sheet are thicker than at least portions of the first member that constitute the first paired side surfaces.

3. The method for manufacturing a bottomed cuboid battery container according to claim 1, further comprising
forming recesses, to which the second flat sheet and the third flat sheet can be fitted, in the first paired side surfaces and the quadrilateral bottom surface of the first member.

4. The method for manufacturing a bottomed cuboid battery container according to claim 3, wherein
the forming recesses includes notching the portion of the first flat sheet to form the set of notches, the portion corresponding to ends of the quadrilateral bottom surface in a perpendicular direction to a direction in which the first paired side surfaces oppose each other.

5. The method for manufacturing a bottomed cuboid battery container according to claim 1, wherein
the first flat sheet is made of A1050 aluminum, and the second flat sheet and the third flat sheet are made of an A3003 aluminum alloy or an A5052 aluminum alloy.

6. A method for manufacturing a bottomed cuboid battery container comprising:

forming a first member by folding one piece of a first flat sheet, the first member being constructed of a quadrilateral bottom surface and first paired side surfaces, the first paired side surfaces continuing from the quadrilateral bottom surface and being opposed to each other; and forming the bottomed cuboid battery container by welding each of a second flat sheet and a third flat sheet to the first member such that the second flat sheet and the third flat sheet oppose each other and constitute second paired side surfaces, the second flat sheet and the first member being welded from a side where one surface of the second flat sheet faces outside of the bottomed cuboid battery container, the third flat sheet and the first member being welded from a side where one surface of the third flat sheet faces outside of the bottomed cuboid battery container;

wherein the second flat sheet and the third flat sheet are thicker than at least portions of the first member that constitute the first paired side surfaces, wherein the first member includes a set of notches, wherein the second flat sheet and the third flat sheet are fitted to respective notches of the set of notches, and wherein depths of each of the notches are substantially equal to thicknesses of each of the second flat sheet and the third flat sheet.

* * * * *